United States Patent
Gray et al.

(10) Patent No.: US 7,870,677 B2
(45) Date of Patent: Jan. 18, 2011

(54) LIGHTWEIGHT WHEEL CLAMP FOR VEHICLE WHEEL ALIGNMENT SYSTEM

(75) Inventors: Brian K. Gray, Conway, AR (US); David A. Jackson, Point Roberts, WA (US)

(73) Assignee: Snap-On Incorporated, Kenosha, WI (US)

( * ) Notice: Subject to any disclaimer, the term of this patent is extended or adjusted under 35 U.S.C. 154(b) by 901 days.

(21) Appl. No.: 11/806,477

(22) Filed: May 31, 2007

(65) Prior Publication Data

US 2008/0296857 A1    Dec. 4, 2008

(51) Int. Cl.
G01B 5/255 (2006.01)
(52) U.S. Cl. .................................... 33/203.18
(58) Field of Classification Search ............. 33/203.18, 33/203.19, 203.2
See application file for complete search history.

(56) References Cited

U.S. PATENT DOCUMENTS

| | | | |
|---|---|---|---|
| 2,475,502 A | 7/1949 | Holmes | |
| 3,990,666 A | 11/1976 | Morrison et al. | |
| 4,095,902 A | 6/1978 | Florer et al. | |
| 4,167,817 A | 9/1979 | Hunter | |
| 4,285,136 A | 8/1981 | Ragan | |
| 4,363,175 A | 12/1982 | Hedahl | |
| 4,377,038 A | 3/1983 | Ragan | |
| 4,408,399 A * | 10/1983 | Darwood et al. | 33/203.18 |
| 4,444,496 A * | 4/1984 | Dale, Jr. | 356/155 |
| 4,569,140 A * | 2/1986 | Hobson | 33/203.18 |
| 5,052,111 A * | 10/1991 | Carter et al. | 33/203.18 |
| 5,056,231 A | 10/1991 | Alusick et al. | |
| 5,535,522 A | 7/1996 | Jackson | |
| 5,724,743 A | 3/1998 | Jackson | |
| 5,781,286 A * | 7/1998 | Knestel | 356/139.09 |
| 5,809,658 A | 9/1998 | Jackson et al. | |
| 5,943,783 A | 8/1999 | Jackson | |
| 6,148,528 A | 11/2000 | Jackson | |

(Continued)

FOREIGN PATENT DOCUMENTS

DE    203 19 147 U1    4/2004

OTHER PUBLICATIONS

International Search Report issued in International Patent Application No. PCT/US2007/023131, mailed May 9, 2008.

(Continued)

*Primary Examiner*—Christopher W Fulton
(74) *Attorney, Agent, or Firm*—McDermott Will & Emery LLP

(57) ABSTRACT

A lightweight wheel clamp assembly is provided for attaching to a vehicle wheel for performing a wheel alignment on the vehicle. Examples include a wheel clamp having an upper sliding bracket for engaging the vehicle wheel, a lower sliding bracket for engaging the vehicle wheel, a guide bar simultaneously slidably engageable with the upper and lower brackets, and a lead screw threadingly engageable with the upper and lower brackets for adjusting a distance between the upper and lower brackets to rigidly attach the wheel clamp assembly to the vehicle wheel. The lower bracket has a plurality of measuring device mounting locations for adjustably mounting a wheel alignment element. The mounting locations are disposed such that when the wheel alignment element is mounted to one of them, the wheel alignment element can sight to a second wheel alignment element on the opposing side of the vehicle.

26 Claims, 15 Drawing Sheets

U.S. PATENT DOCUMENTS

| | | | |
|---|---|---|---|
| 6,237,234 B1 | 5/2001 | Jackson et al. | |
| 6,313,911 B1 | 11/2001 | Stieff | |
| 6,483,577 B2 | 11/2002 | Stieff | |
| 6,532,062 B2 | 3/2003 | Jackson et al. | |
| 6,560,883 B2 | 5/2003 | Jackson et al. | |
| 6,661,505 B2 | 12/2003 | Jackson et al. | |
| 6,823,601 B2 | 11/2004 | Murray | |
| 6,931,736 B2 * | 8/2005 | Stopa | 33/203 |
| 7,089,776 B2 | 8/2006 | Dale, Jr. | |
| 7,121,011 B2 | 10/2006 | Murray et al. | |
| 7,150,105 B1 * | 12/2006 | Battaglia et al. | 33/203.18 |
| D590,279 S * | 4/2009 | Gray | D10/46 |
| 2002/0095802 A1 * | 7/2002 | Gray et al. | 33/203 |
| 2004/0035898 A1 | 2/2004 | Gilstrap | |
| 2005/0082730 A1 | 4/2005 | Murray et al. | |

OTHER PUBLICATIONS

International Search Report and the Written Opinion of the International Searching Authority issued in Patent Application No. PCT/US2007/023131 dated on Sep. 26, 2008.

* cited by examiner

LIGHTWEIGHT WHEEL CLAMP FOR VEHICLE WHEEL ALIGNMENT SYSTEM

TECHNICAL FIELD

The present subject matter relates to wheel alignment equipment for vehicles. The present subject matter has particular applicability to wheel clamps for attaching alignment elements to vehicle wheels.

BACKGROUND ART

Certain current conventional vehicle wheel alignment systems use alignment elements referred to as "alignment heads" that are attached to the wheels of a vehicle to measure various angles of the wheels and suspension. These angles are communicated to a host system, where they are used in the calculation of vehicle alignment angles. In the standard conventional aligner configuration, four alignment heads are attached to respective wheels of a vehicle. Each alignment head comprises two horizontal or toe measurement sensors and two vertical or camber/ pitch sensors. Each alignment head also contains electronics to support overall sensor data acquisition as well as communications with the aligner console, local user input, and local display for status feedback, diagnostics and calibration support. Other conventional alignment systems, referred to as "visual aligners", use optical targets attached to each vehicle wheel instead of sensors. The targets are imaged by cameras, and these visual images are used to calculate the vehicle wheel alignment angles.

Such alignment equipment usually includes a wheel clamp that attaches to a vehicle's wheel and carries the alignment element (i.e., the sensor equipment that measures the alignment angles of the vehicle, or the optical target). Referring now to FIG. 1, a conventional wheel clamp 100 includes a pair of upper and lower sliding brackets 105, 110, respectively, for engaging the rim of the vehicle wheel, and a center bracket 115 for holding an alignment element. Brackets 105, 110, 155 are all slidably mounted on a pair of guide bars 120, 125. A lead screw 130 threadingly engages upper and lower brackets 105, 110 for clamping the clamp 100 to the vehicle wheel. The vehicle being aligned is usually positioned on a vehicle alignment lift at heights from three to four feet for performing alignments. The vehicle is usually raised even higher, up to six feet, for servicing the vehicle from underneath.

There exist a need to lower the weight of alignment equipment, such as wheel clamp 100, that an alignment technician attaches to a vehicle's wheel. Lower weight reduces the amount of kinetic energy (i.e., shock loading) that is imparted to this equipment in case it falls off a wheel to which it is attached, thereby reducing the chance of damaging the equipment. Lower weight has the added benefit of reducing strain and fatigue on the technician lifting and holding this equipment up until it can be attached to a vehicle's wheel. A typical four-wheel alignment requires the technician perform such a lifting/holding operation for each of the four wheels of the vehicle, and this operation may be performed several times a day in a typical alignment shop.

SUMMARY

The teachings herein improve over conventional alignment equipment by reducing the weight of the equipment while simplifying the equipment, thereby reducing costs.

For example, a lightweight wheel clamp assembly for attaching to a vehicle wheel for performing a wheel alignment on the vehicle includes an upper sliding bracket for engaging the vehicle wheel; a lower sliding bracket for engaging the vehicle wheel; a guide bar simultaneously slidably engagable with the upper and lower brackets; and a lead screw threadingly engagable with the upper and lower brackets when the guide bar is engaging the upper and lower brackets, for adjusting a distance between the upper and lower brackets to rigidly attach the wheel clamp assembly to the vehicle wheel. The lower bracket has a measuring device mounting location for adjustably mounting a wheel alignment element to the lower bracket.

Another aspect of the present disclosure is a lightweight wheel clamp wherein the lower bracket comprises a plurality of measuring device mounting locations for adjustably mounting a wheel alignment element to one of the mounting locations. The wheel alignment element is for sighting across a transverse axis of the vehicle to a second wheel alignment element on the other side of the vehicle when the wheel alignment element is mounted to the lower bracket. The mounting locations are disposed such that when the wheel alignment element is mounted to one of them, the wheel alignment element can sight to the second wheel alignment element.

Another aspect of the present disclosure is a lightweight wheel clamp wherein the wheel alignment element is rotatably mountable to the measuring device mounting location, and the lower bracket comprises a movable member for engaging the wheel alignment element when it is mounted to the measuring device mounting location, for holding the wheel alignment element in a predetermined tilted position relative to the lower bracket.

Additional advantages and novel features will be set forth in part in the description which follows and in part will become apparent to those having ordinary skill in the art upon examination of the following and the accompanying drawings or may be learned from production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, elements having the same reference numeral designations represent like elements throughout.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The present teaching addresses and solves problems of operator fatigue and stress, and equipment damage stemming from conventional heavy wheel clamps. Reducing the weight of the wheel clamp assembly aids in reducing the kinetic energy (i.e., shock loading) to which the attached sensor will be exposed in case it is dropped. It will also reduce the strain/fatigue that the operator will experience in the daily operation of attaching this equipment to a vehicle.

Figure 1:
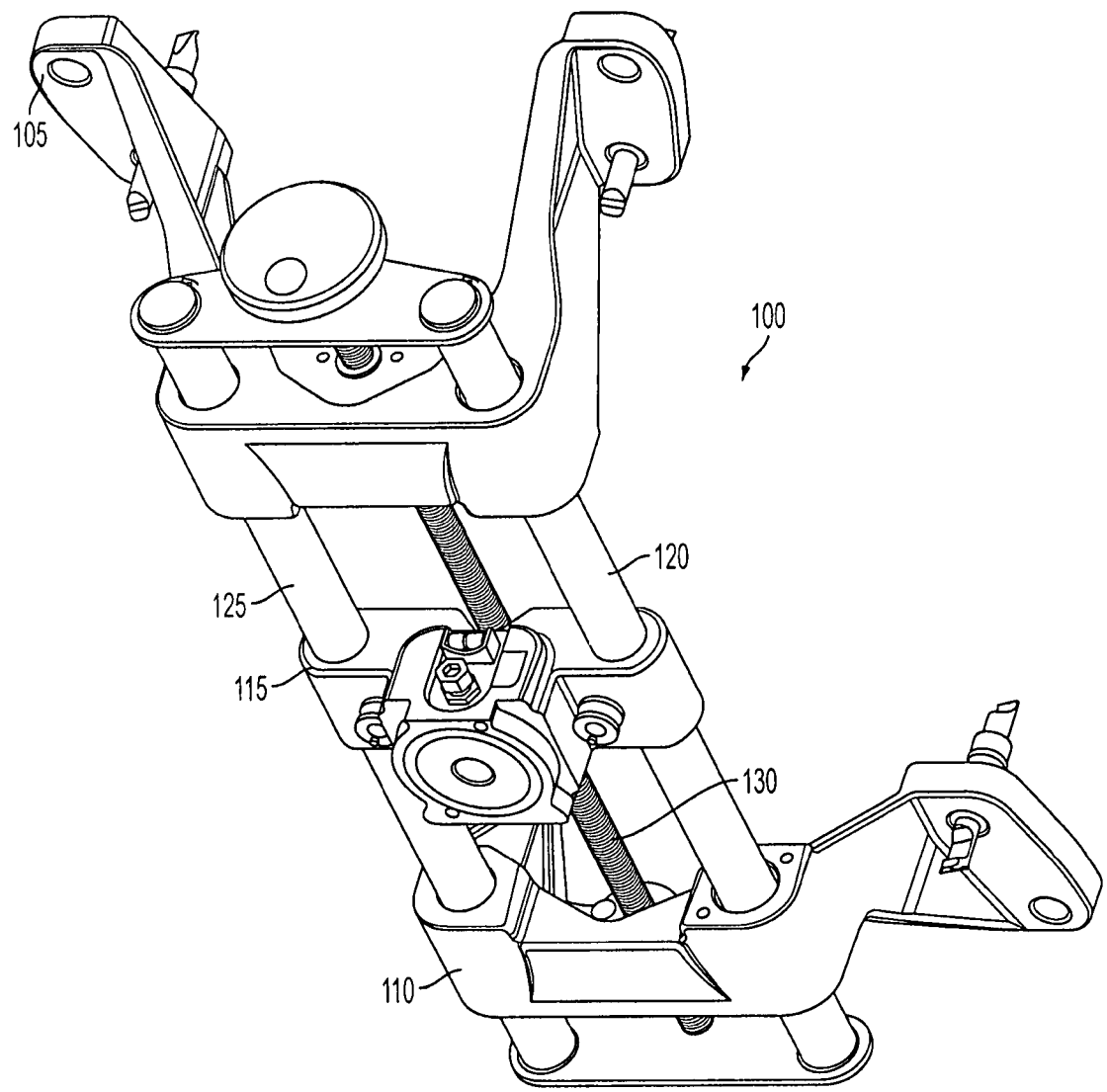
FIG. 1 illustrates a conventional wheel clamp for performing a wheel alignment on a vehicle.

According to the present teachings, the weight of a wheel clamp is reduced by using cast magnesium parts to replace cast aluminum parts. In addition, certain parts have been eliminated from the industry standard configuration wheel clamp shown in FIG. 1 to reduce clamp weight. In certain examples, one of the two guide bars has been eliminated, and the center lead screw is located at one side of the clamp to serve the functions of both the lead screw and a guide bar. In other examples, the entire center sliding bracket that was previously used at the attachment point for the measuring device is eliminated, and the measuring device is attached to the lower bracket, which has been redesigned to accommodate the attachment.

By eliminating these parts and employing a lighter material, a significant weight reduction is achieved, which reduces kinetic energy resulting from a drop, makes the equipment easier to use, and reduces operator fatigue.

Figure 2:
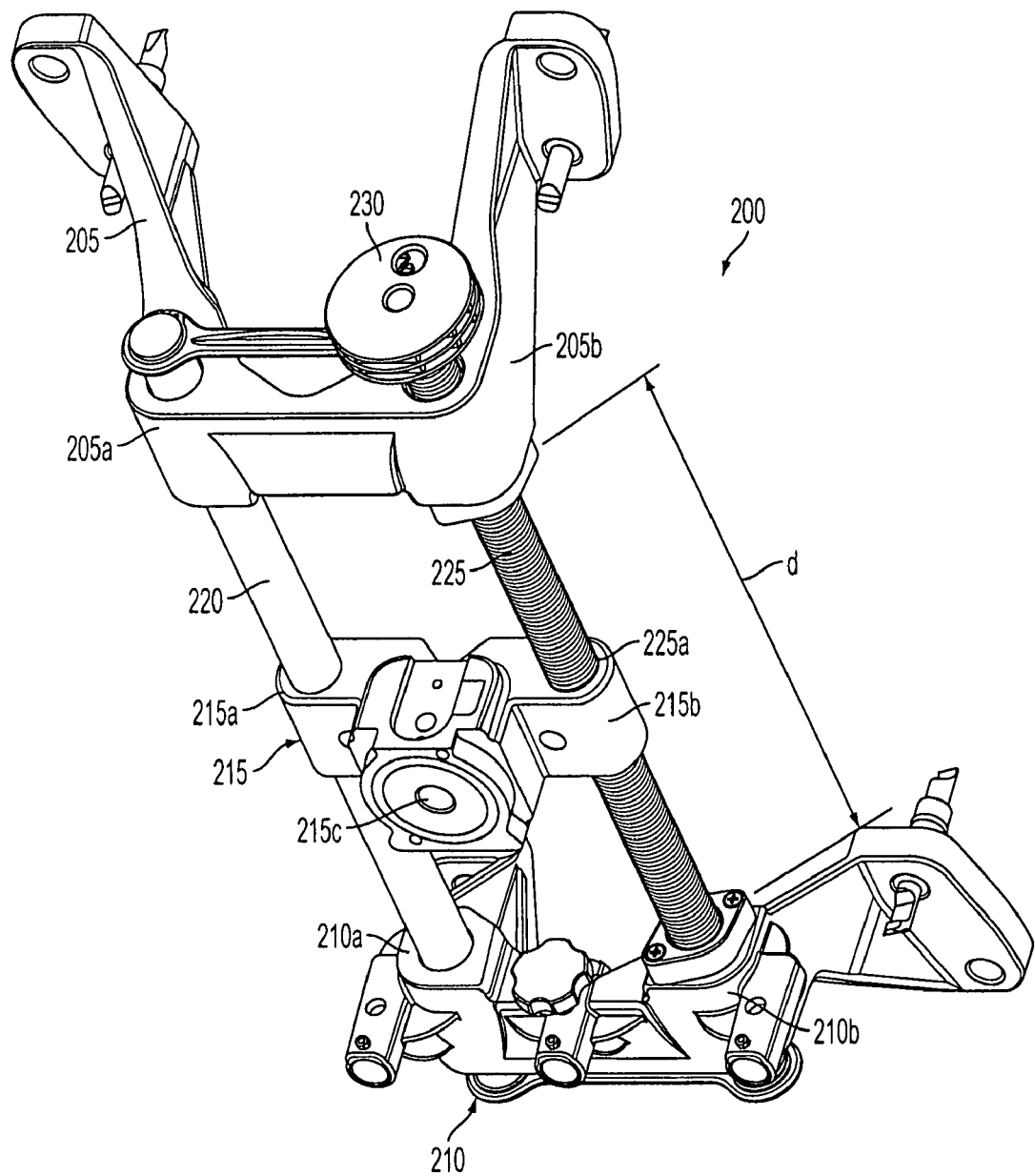
FIG. 2 illustrates one example of a lightweight wheel clamp.

The present subject matter will now be described in detail with reference to FIGS. 2-6e. Referring now to FIG. 2, one example of a lightweight wheel clamp assembly 200 for attaching to a vehicle wheel (not shown) for performing a wheel alignment on the vehicle includes an upper sliding bracket 205 and a lower sliding bracket 210 for engaging the vehicle wheel in a conventional manner, such as by four point mounting. A center sliding bracket 215 is provided for adjustably mounting a conventional wheel alignment element (not shown), such as an alignment head, a target, etc. at a central mounting position 215c.

Exactly one guide bar 220, such as a round bar, simultaneously slidably engages the upper, center and lower brackets 205, 210, 215 when the upper and lower brackets 205, 210 are engaging the vehicle wheel, while a lead screw 225 threadingly engages the upper and lower brackets 205, 210, for adjusting a distance d between the upper and lower brackets 205, 210, as by turning lead screw 225 via knob 230, to rigidly attach the wheel clamp assembly 200 to the vehicle wheel. The upper, center and lower brackets 205, 210, 215 each has a first lateral end 205a, 210a, 215a and a second lateral end 205b, 210b, 215b. The guide bar engages 220 proximal the first lateral ends 205a, 210a, 215a, and the lead screw 225 engages proximal the second lateral ends 205b, 210b, 215b. Thus, lead screw 225 is located at one side of the clamp 200 to serve the functions of both a lead screw and a guide bar.

The lead screw 225 has a non-threaded portion 225a at a predetermined position along its longitudinal axis (e.g., at about the center of lead screw 225), at which center bracket 215 is rotatably mounted in a conventional manner. Therefore, center bracket 215 is self-centered on lead screw 225 and guide bar 220 when the distance d between the upper and lower brackets 205, 210 is adjusted.

The guide bar 220 and the lead screw 225 are substantially parallel to each other and spaced from each other when they are engaging the upper, center and lower brackets 205, 210, 215. The upper, center and lower brackets 205, 210, 215 comprise cast magnesium to reduce weight.

Figure 3A:
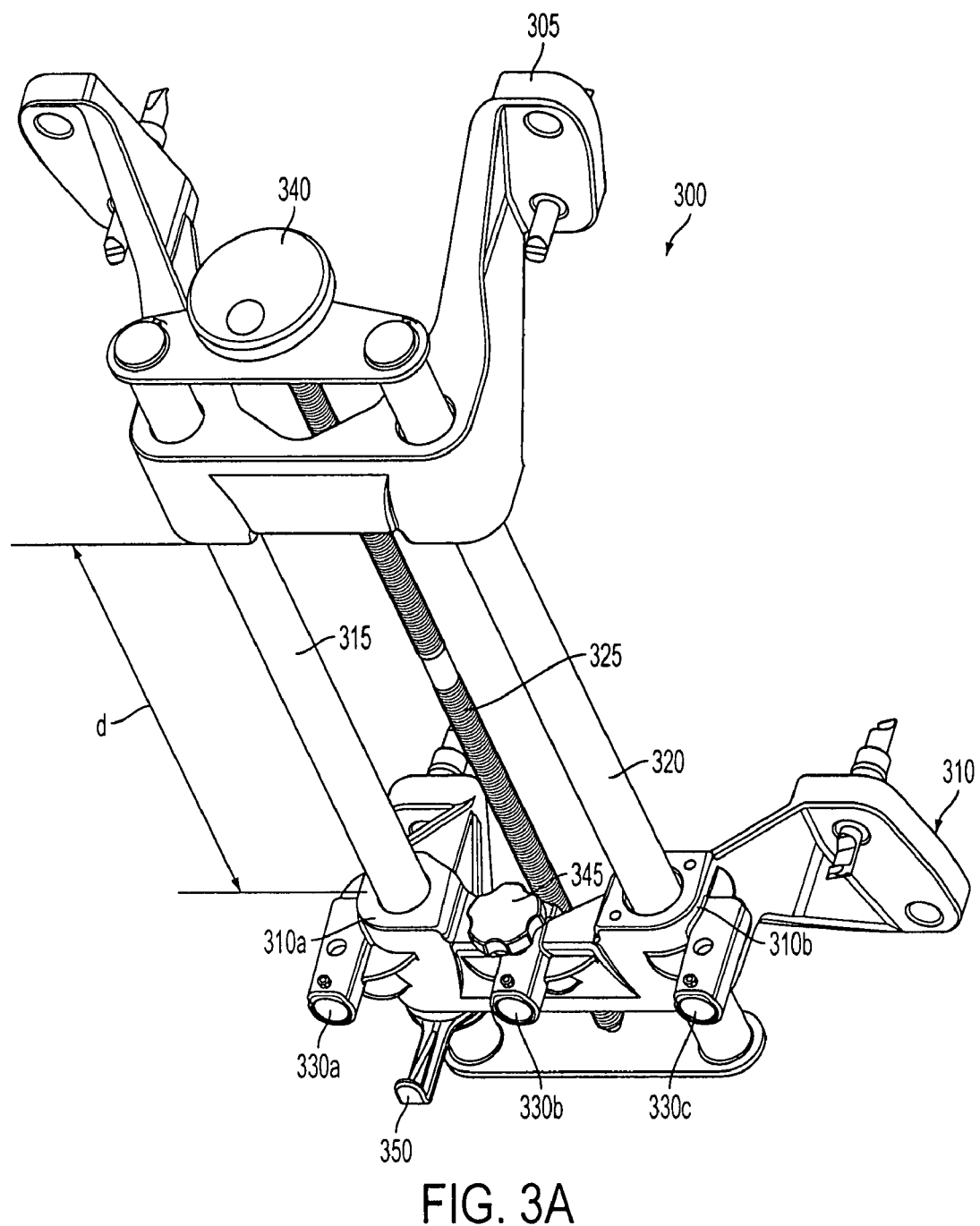
FIG. 3a illustrates another example of a lightweight wheel clamp.

FIG. 3a depicts an example of a lightweight wheel clamp wherein the center mounting bracket has been eliminated to reduce weight, and an alignment element, such as a measurement head or a target, attaches to a bottom bracket instead of the center bracket. Referring now to FIG. 3a, lightweight wheel clamp assembly 300 for attaching to a vehicle wheel (not shown) includes an upper sliding bracket 305 and a lower sliding bracket 310 for engaging the vehicle wheel in a conventional manner. The upper and lower brackets 305, 310 comprise cast magnesium to further reduce weight. A pair of guide bars 315, 320 simultaneously slidably engage the upper and lower brackets 305, 310, and a lead screw 325 is threadingly engagable with the upper and lower brackets 305, 310 when the guide bars 315, 320 are engaging the upper and lower brackets 305, 310 for adjusting a distance d between the upper and lower brackets 305, 310 to rigidly attach the wheel clamp assembly 300 to the vehicle wheel, as by turning knob 340.

Conventional measurement heads typically include a cross toe sensor for sighting across a transverse axis of the vehicle to another measurement head on the other side of the vehicle, for making cross toe measurements. There exists a working geometry for a measurement head that optimizes the head for use on a wide variety of wheel and tire sizes. Too small and the head's cross toe sensor will not be able to see around the tire profile for cross toe measurement. Too large and the sensor will interfere with the vehicle's body, fenders flares, etc. Wheel alignment measurement heads typically are self-leveling devices that are attached to the wheel clamps near the rotational center of the wheel. For example, the measurement head may have a shaft that fixedly engages the wheel clamp, and bearings on the shaft inside of the housing of the measurement head to allow the head to rotate about the shaft. Therefore, as the wheel rotates, the position of the cross toe sensor does not change significantly with respect to the perimeter of the tire when it is mounted to a wheel clamp having a center bracket.

Figure 3B:
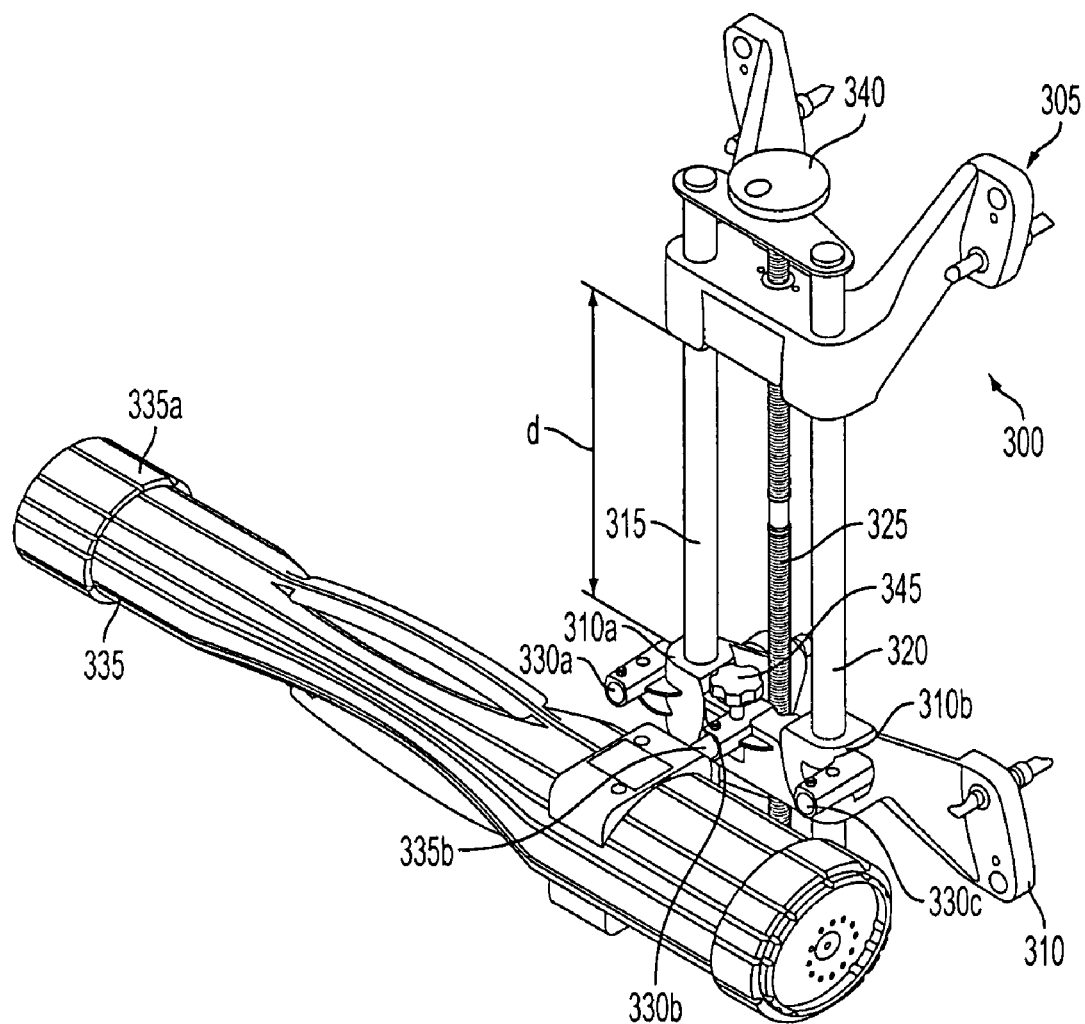
FIG. 3b illustrates the wheel clamp of FIG. 3a with an alignment element attached.
Figure 3C:
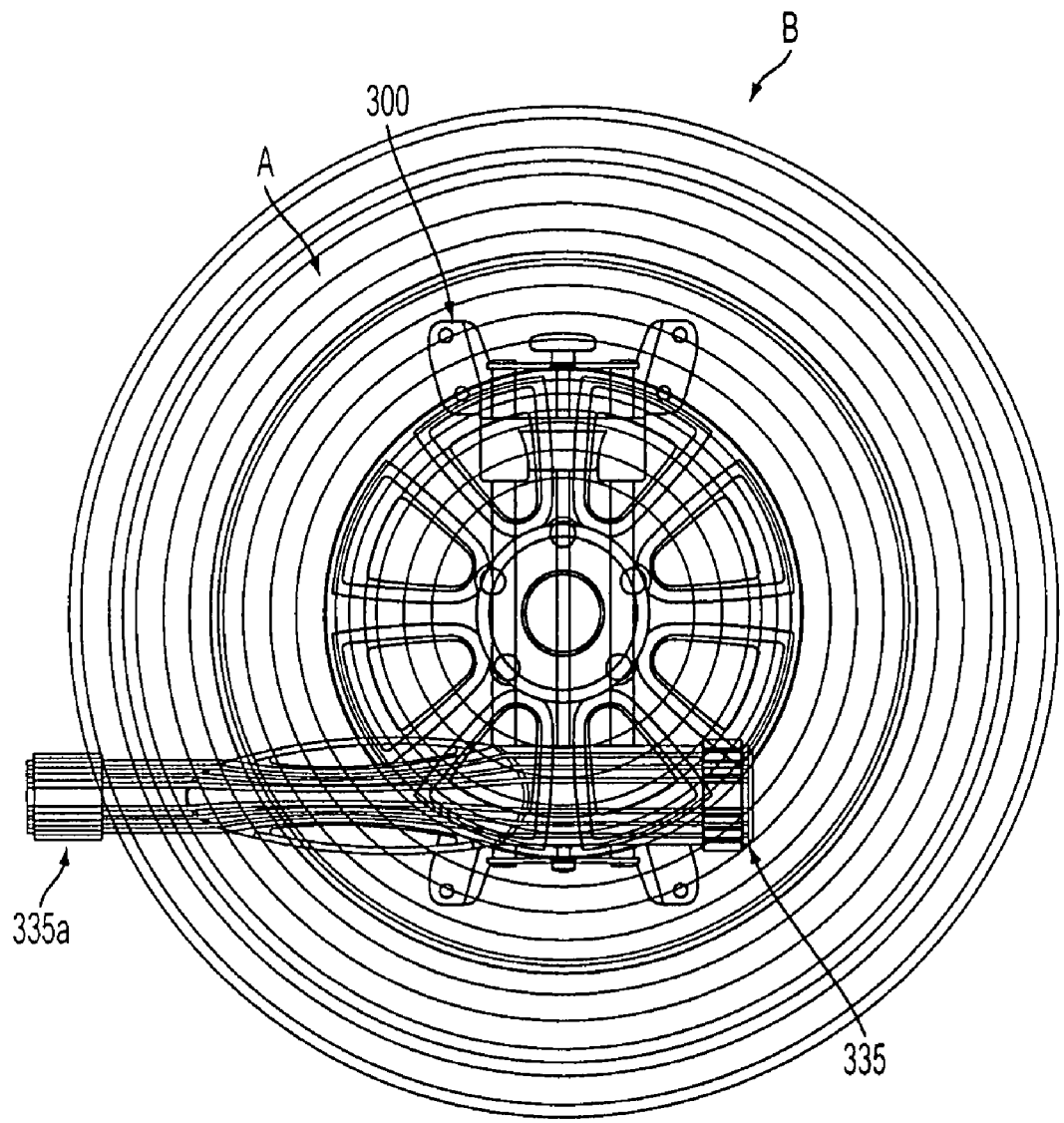
FIGS. 3c-3e illustrate the lightweight wheel clamp/alignment element assembly of FIG. 3a attached to a vehicle wheel, and are useful in explaining the relationship of the alignment element to the vehicle wheel.

To reduce weight and cost, the clamp of this embodiment has been redesigned to attach the measurement head at the lower clamp bracket rather than a center bracket, as shown in FIGS. 3b and 3c. When a measurement head 335 is attached to the new clamp 300, it will ideally be oriented as shown in FIG. 3c such that the portion 335a of the head 335 where its cross toe sensor is disposed can view under the vehicle to the other measurement head. Arrow "A" indicates the outer diameter of a 32" diameter tire, and arrow "B" indicates the outer diameter of a 40" diameter tire.

Figure 3D:
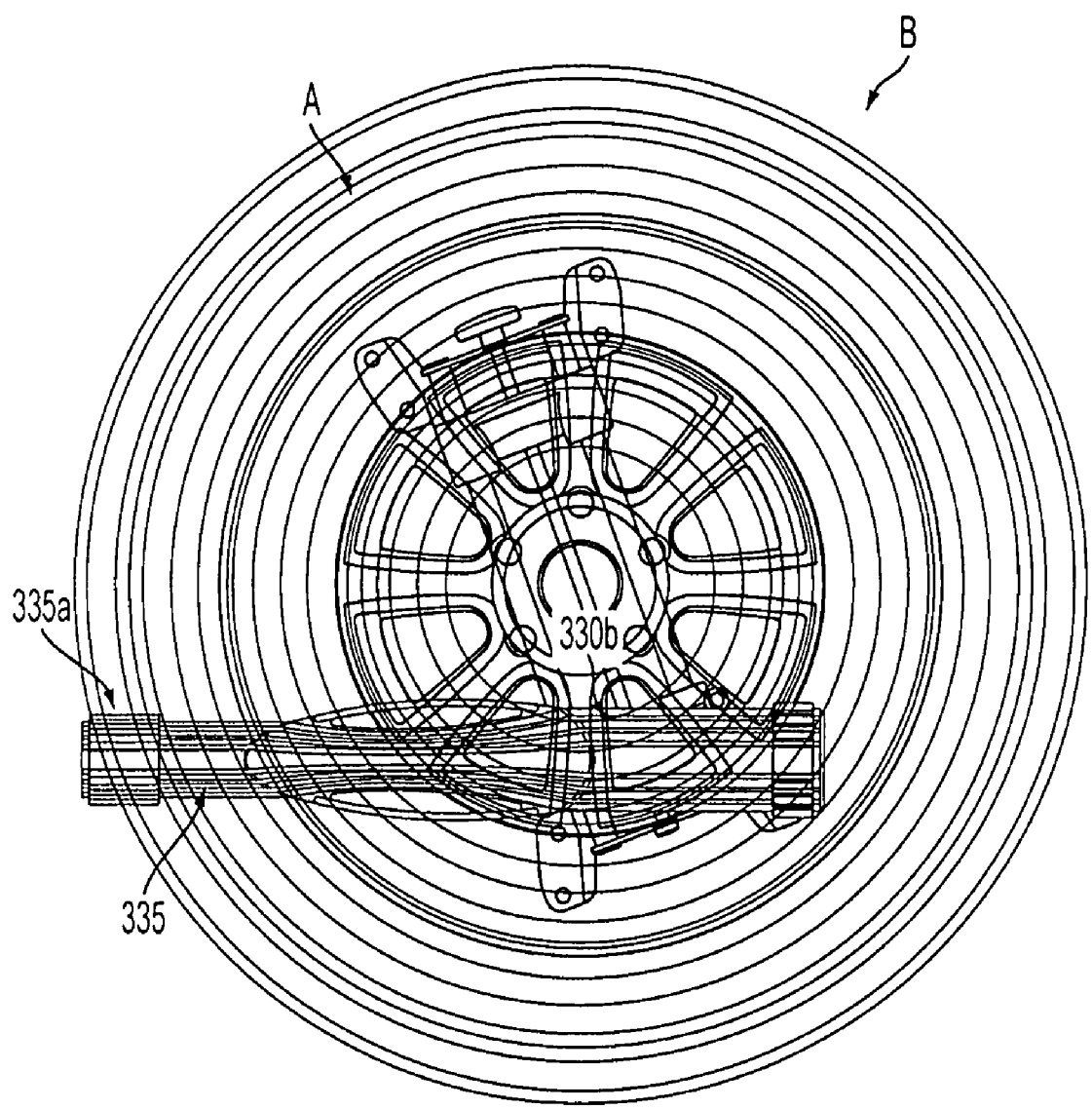

During a typical rolling runout compensation procedure of a wheel alignment, the vehicle is usually rolled either forward or backward, or a split roll is performed. This runout compensation method causes a measurement head mounted to the new wheel clamp of this disclosure to move either forwards, backwards or both (if a split roll is used) because of the clamp configuration. Such movement can cause the cross toe portion 335*a* of a head 335 of optimal geometry to be blocked when used with a large profile tire having on outer diameter B, as shown in FIG. 3*d*.

There are at least two ways to overcome the blockage of the cross toe sensors when performing rolling runout on vehicles having large wheels (i.e., greater than 32 inch diameter). The measurement heads can be made longer so that their cross toe sensors always extend beyond the perimeter of the tire even when the wheel is rolled as shown in FIG. 3*d*. However, this increases the weight of the measurement heads and makes them more cumbersome to use. A more advantageous solution is to incorporate more than one measurement head mounting location in the lower bracket 310 of the wheel clamp 300.

Figure 3E:
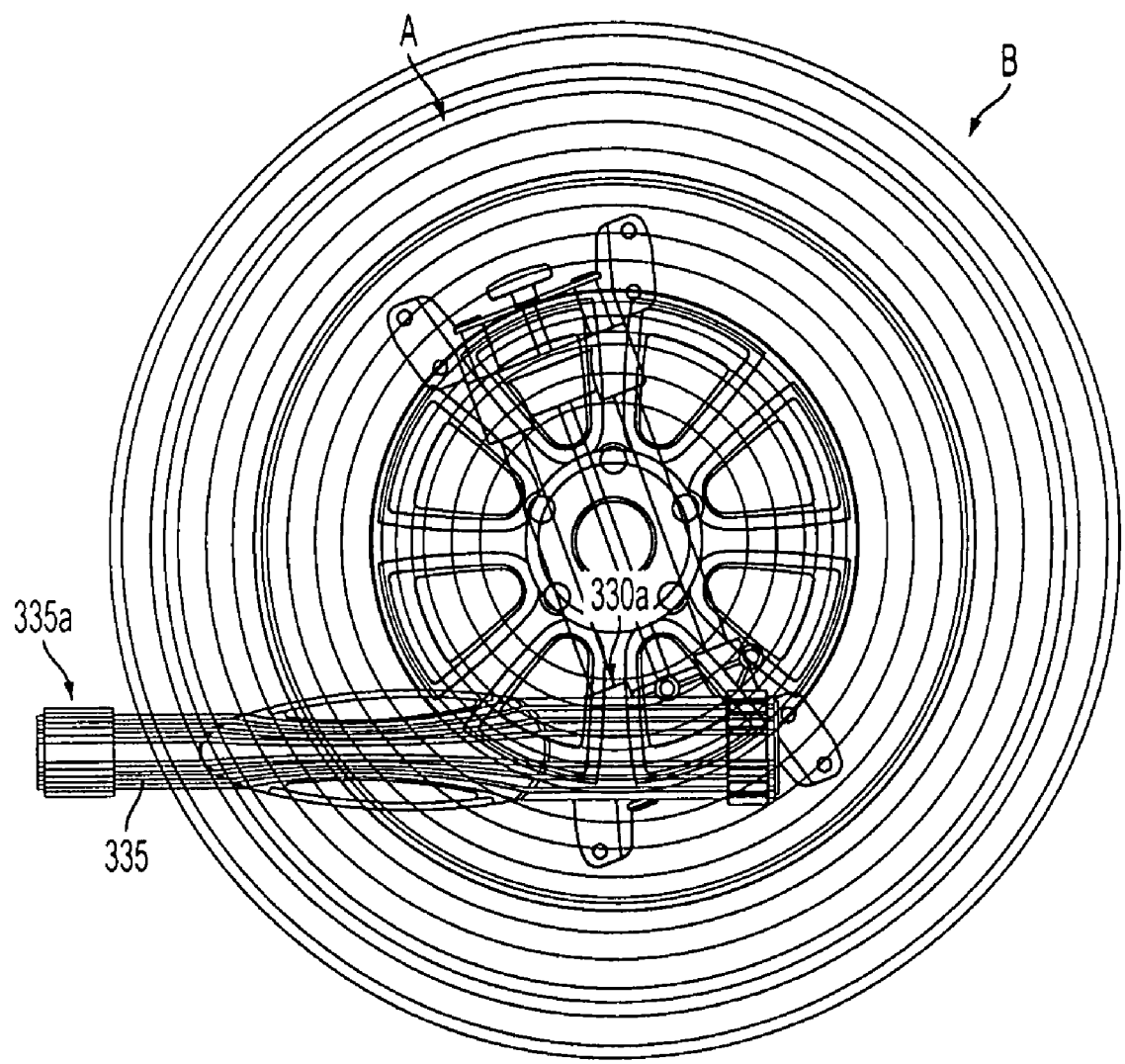

As shown in FIG. 3*a*, the lower bracket 310 of clamp 300 incorporates a plurality of mounting locations 330*a*-330*c* for adjustably mounting the measurement head 335 so that it can be laterally repositioned to enable operation with large diameter wheels. Each of the measuring device mounting locations 330*a*-*c* comprises a hole for mounting the wheel alignment element 335. This provides for the measurement head to have an optimal geometry profile, but allows for quick lateral repositioning of the head 335 on the wheel clamp 300 before performing runout compensation, so that the cross toe sensor portion 335*a* of the head 335 can see around large profile tires larger than 32" (such as having an outer diameter B), as shown in FIG. 3*e*.

Referring again to FIG. 3*a*, the measuring device mounting locations 330*a*-*c* include a center mounting location 330*b* between first and second lateral ends 310*a*, 310*b* of lower bracket 310, a first offset mounting location 330*a* proximal the first lateral end 310*a*, and a second offset mounting location 330*c* proximal the second lateral end 310*b* of the bracket 310. The mounting locations 330*a*-*c* are disposed such that when the wheel alignment element, such as measurement head 335, is mounted to one of them, the wheel alignment element 335 can sight across a transverse axis of the vehicle to a second wheel alignment element (not shown) on the other side of the vehicle.

In use, the measurement head 335 is normally attached in the center mounting location 330*b* as shown in FIGS. 3*b*-3*d*. This position provides the best balance for the clamp/measuring head combination, so it is the most comfortable position to use. As discussed hereinabove, a typical self-leveling measurement head 335 has a shaft 335*b* that engages center mounting location 330*b* and is fixed thereto by tightening a clamp 345. Bearings (not shown) on the shaft 335*b* inside of the measurement head 335 allow the head to rotate about the shaft 335*b* in a conventional manner. When measuring a large diameter wheel (having an outer diameter such as B), the cross toe sensor of head 335 will be blocked when the wheel is rolled for runout compensation, as shown in FIG. 3*d*. To overcome this problem the measurement head 335 is attached in mounting location 330*a* so that the cross toe sensor is moved farther out from the perimeter of the tire, as shown in FIG. 3*e*. Thus, when the wheel is rolled, the cross toe sensor can still see across the vehicle. Of course, if measurement head 300 was used on the opposite side of the vehicle as shown in FIGS. 3*c*-*e*, the measurement head 335 would need to be attached at the third mounting location 330*c*.

Figure 4:
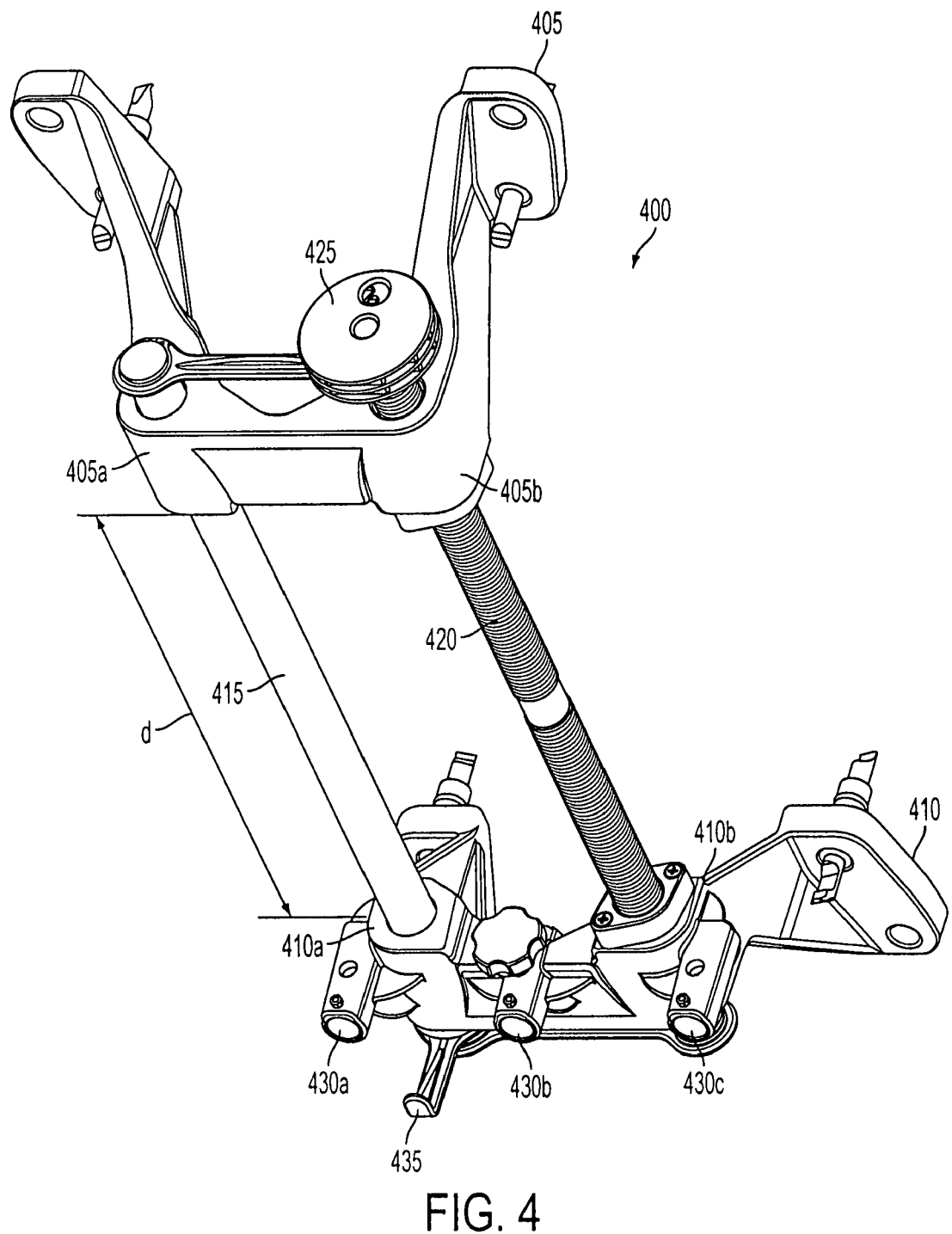
FIG. 4 illustrates yet another example of a lightweight wheel clamp.

FIG. 4 depicts an example of a lightweight wheel clamp 400 for attaching to a vehicle wheel (not shown) for performing a wheel alignment on the vehicle, wherein the center mounting bracket and a guide bar have been eliminated to reduce weight, a lead screw is used as one of the guide bars, and an alignment element, such as a measurement head or a target, attaches to a bottom bracket instead of the center bracket. The wheel clamp assembly 400 includes an upper sliding bracket 405 and a lower sliding bracket 410 for engaging the vehicle wheel. The upper and lower brackets 405, 410 comprise cast magnesium to reduce weight.

Exactly one guide bar 415 is provided to simultaneously slidably engage the upper and lower brackets 405, 410 when the upper and lower brackets are engaging the vehicle wheel. A lead screw 420 is threadingly engagable with the upper and lower brackets 405, 410 when the guide bar 415 is engaging the upper and lower brackets 405, 410, for adjusting a distance d between the upper and lower brackets 405, 410 to rigidly attach the wheel clamp assembly 400 to the vehicle wheel, as by turning knob 425.

The guide bar 415 and the lead screw 420 are substantially parallel to each other and spaced from each other when the guide bar 415 and the lead screw 420 are engaging the upper and lower brackets 405, 410. The upper and lower brackets 405, 410 each have a first lateral end 405*a*, 410*a* and a second lateral end 405*b*, 410*b*. The guide bar 415 engages proximal the first lateral end 405*a*, 410*a* of each of the brackets, and the lead screw 420 engages proximal the second lateral end 405*b*, 410*b* of each of the brackets.

Similarly to the example of FIG. 3*a*, the lower bracket 410 comprises one or more measuring device mounting locations 430*a*-*c*, such as holes, for adjustably mounting a wheel alignment element (not shown) to one of the mounting locations 430*a*-*c* so that it can be laterally repositioned to enable operation with large diameter wheels. Lower bracket 410 is identical in this measurement head-mounting functionality to the lower bracket 310 of FIG. 3*a*. In particular, the plurality of measuring device mounting locations 430*a*-*c* includes a center mounting location 430*b* between the first and second lateral ends 410*a*, 410*b* of bracket 410, a first offset mounting location 430*a* proximal the first lateral end 410*a* of the bracket, and a second offset mounting location 430*c* proximal the second lateral end 410*b* of the bracket, so that the wheel alignment element can sight across a transverse axis of the vehicle to a second wheel alignment element on the other side of the vehicle when the wheel alignment element is mounted to the lower bracket 410 using one of the mounting locations 430*a*-*c*.

As discussed hereinabove, conventional measurement heads have a cross toe sensor that needs to be able to "see" another alignment sensor on the opposite side of the vehicle by viewing underneath a vehicle. In so doing, the cross toe sensor of the measurement head can be blocked by obstacles such as suspension parts, gas tanks, mufflers, etc. When this happens, the wheel alignment system is not capable of making cross toe measurements for the wheels associated with the blocked sensors.

This problem is solved in the prior art by lowering the cross toe sensors. Some solutions, implemented with a center bracket-mounted measurement head, utilize a sliding center bracket section on the wheel clamp that can slide down on the guide rods of the clamp to lower the entire measurement head. Other solutions use a drop down adapter that mounts between the wheel clamp and the measurement head to lower the entire measuring head. Still other solutions tilt the measurement heads down to view under the vehicle, and use a manual brake mechanism in the measurement head to lock the heads in the tilted position. Since measurement heads are generally balanced to be self-leveling, they would not stay in the tilted position without the use of a brake to lock them in that attitude. In most cases, the measurement heads on both sides of the vehicle must be tilted down by the same angle.

In a further example of the present disclosure, small counter weights are moved or attached to the measurement head to cause the measurement head to tilt a prescribed amount, so that the sensor can see underneath any obstacles. The weight can be permanently attached to the handle and slid from one side (balanced) to the other side (tilted down). Alternatively a counterweight can be removed from the center shaft pivot area and reattached to the cross toe area to cause the sensor to tilt down.

Figure 5A:
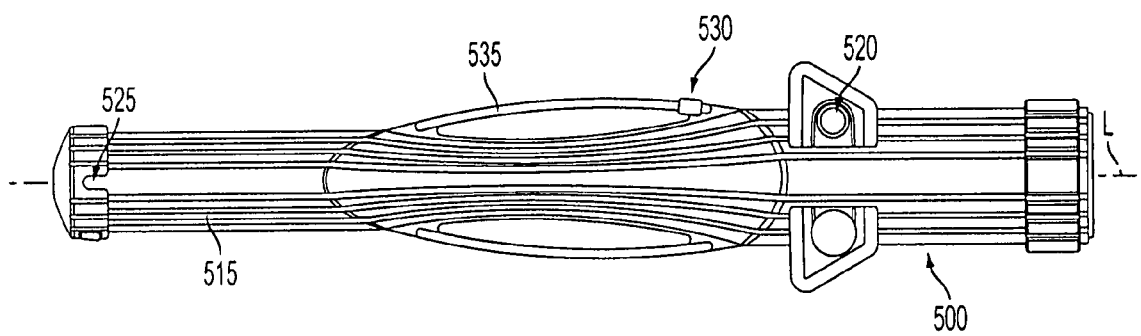
FIGS. 5a and 5b illustrate an alignment element having a tilting mechanism.
Figure 5B:
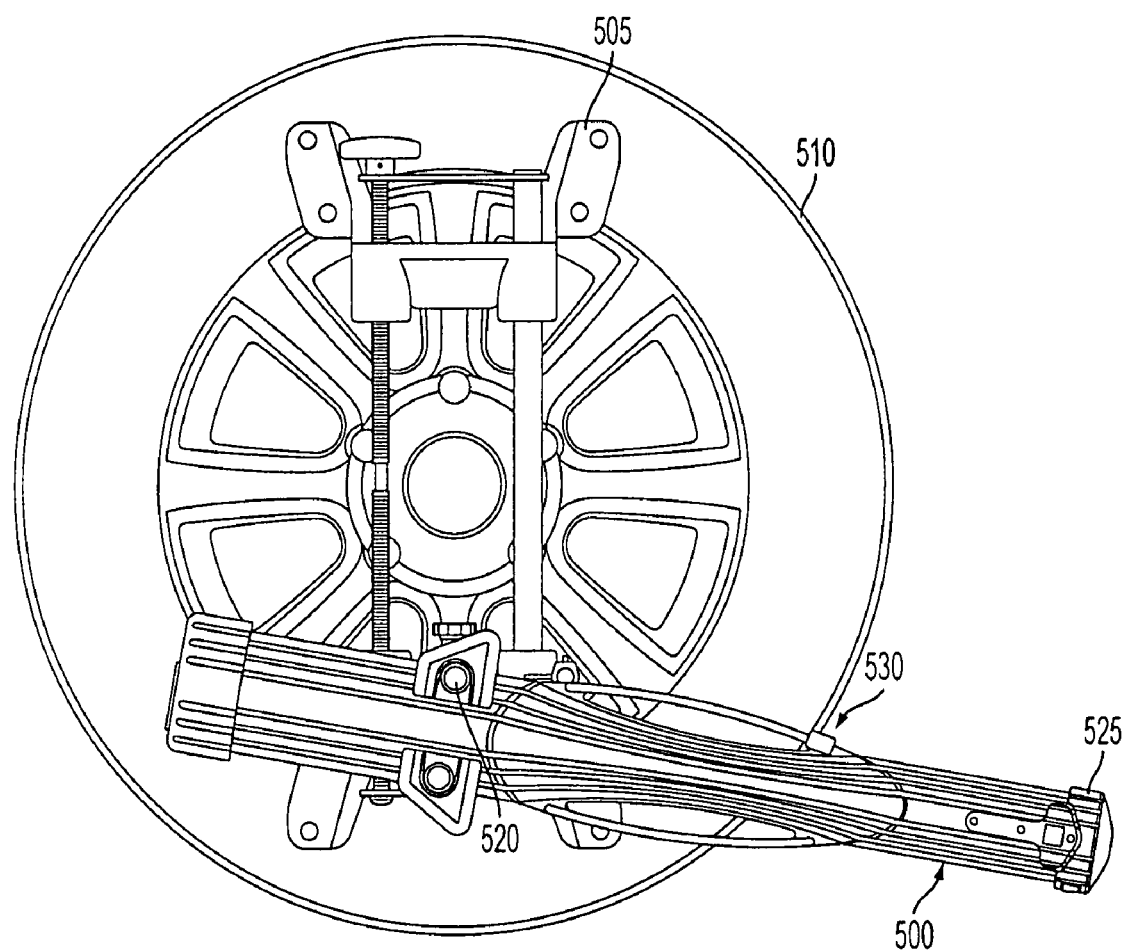

Referring now to FIGS. 5a and 5b, a wheel alignment element 500, such as a measurement head, for mounting to a wheel clamp assembly 505 attached to a wheel 510 of a vehicle has an elongated body 515 having a longitudinal axis L, a horizontal mount 520 attached to the body 515 along the longitudinal axis L and perpendicular to the longitudinal axis L for rotatably mounting the body 515 to the wheel clamp 505, and a wheel alignment sensor 525, such as a cross toe sensor, mounted proximal an end of the body 515. A weight 530 is movably mounted to the body 515 along the longitudinal axis L for tilting the body 515 to a predetermined position relative to the wheel clamp 505 (see FIG. 5b). In the example of FIGS. 5a and 5b, the weight 530 is slidably mounted to the body 515; i.e., mounted to a handle 535 on the body 515. Alternatively, the weight 530 is removable and replaceable in a plurality of locations along the longitudinal axis L.

Figure 6A:
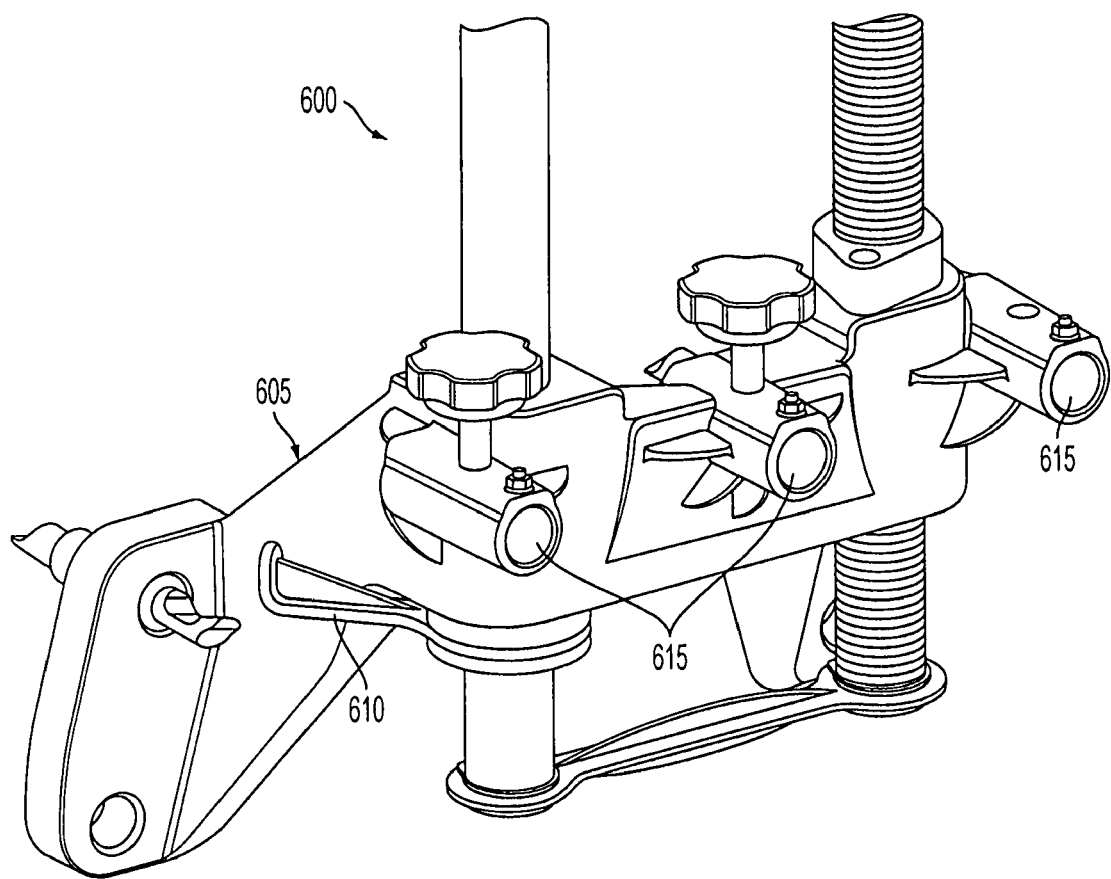
FIGS. 6a and 6b illustrate a lightweight wheel clamp having a tilting mechanism.
Figure 6B:
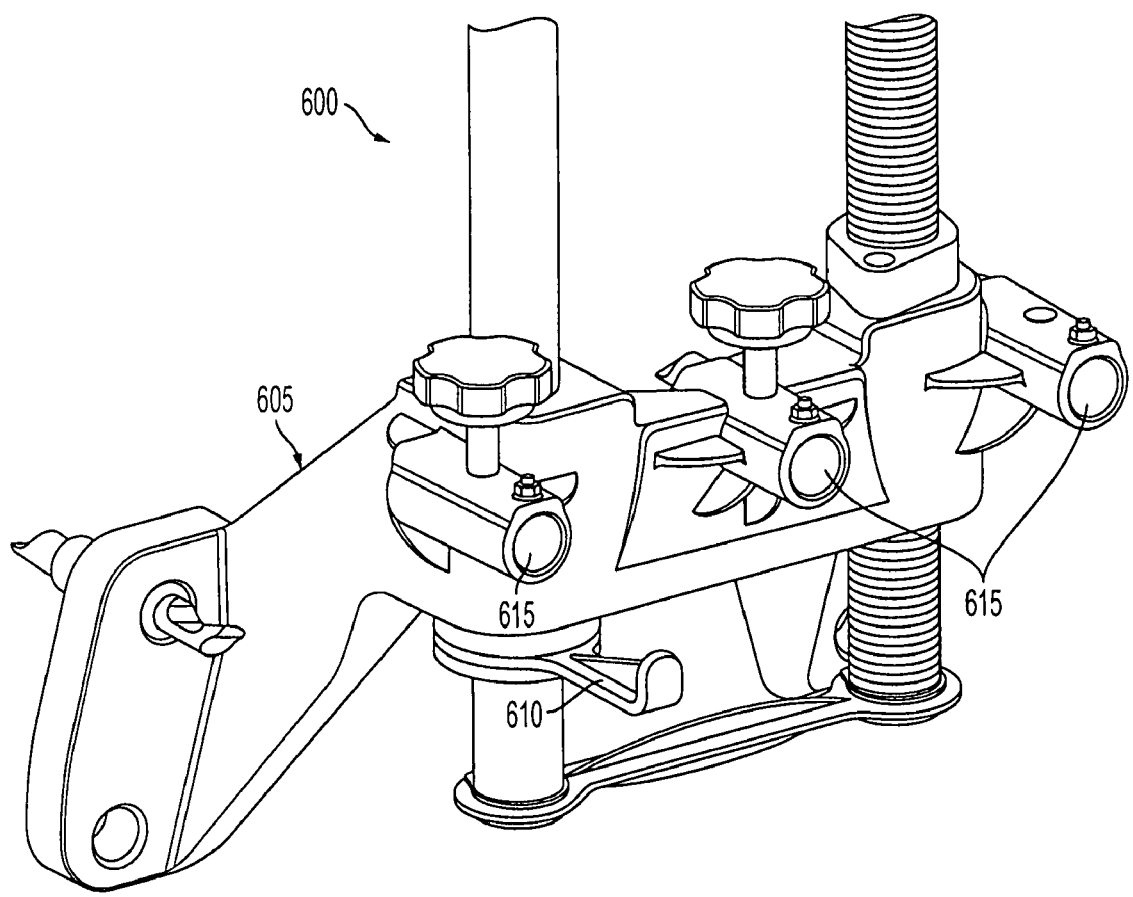

In yet another example of the present disclosure, shown in FIGS. 6a-6f, an alignment element, such as a measurement head, is held at a predetermined tilted position via a pivoting member of the lower bracket of the wheel clamp to which the alignment element is mounted. Referring to FIGS. 6a and 6b, a wheel clamp 600 has a lower bracket 605 to which a movable member 610 is pivotably mounted. Lower bracket 605 has mounting locations 615 for mounting an alignment element (not shown). Member 610 is movable from a first position, shown in FIG. 6a, where it is not engaged with the alignment element, to a second position, shown in FIG. 6b, where the movable member can engage the alignment element when it is mounted at one of the mounting locations 615. Those skilled in the art will understand that the lower bracket 605 of FIGS. 6a-6f is functionally the same as the lower bracket 310 of wheel clamp 300 of the example shown in FIG. 3a, wherein a pivoting movable member 350 analogous to movable member 610 is shown. Likewise, the lower bracket 605 of FIGS. 6a-6f is functionally the same as the lower bracket 410 of wheel clamp 400 of the example shown in FIG. 4, wherein a pivoting movable member 435 analogous to movable member 610 is shown.

Figure 6C:
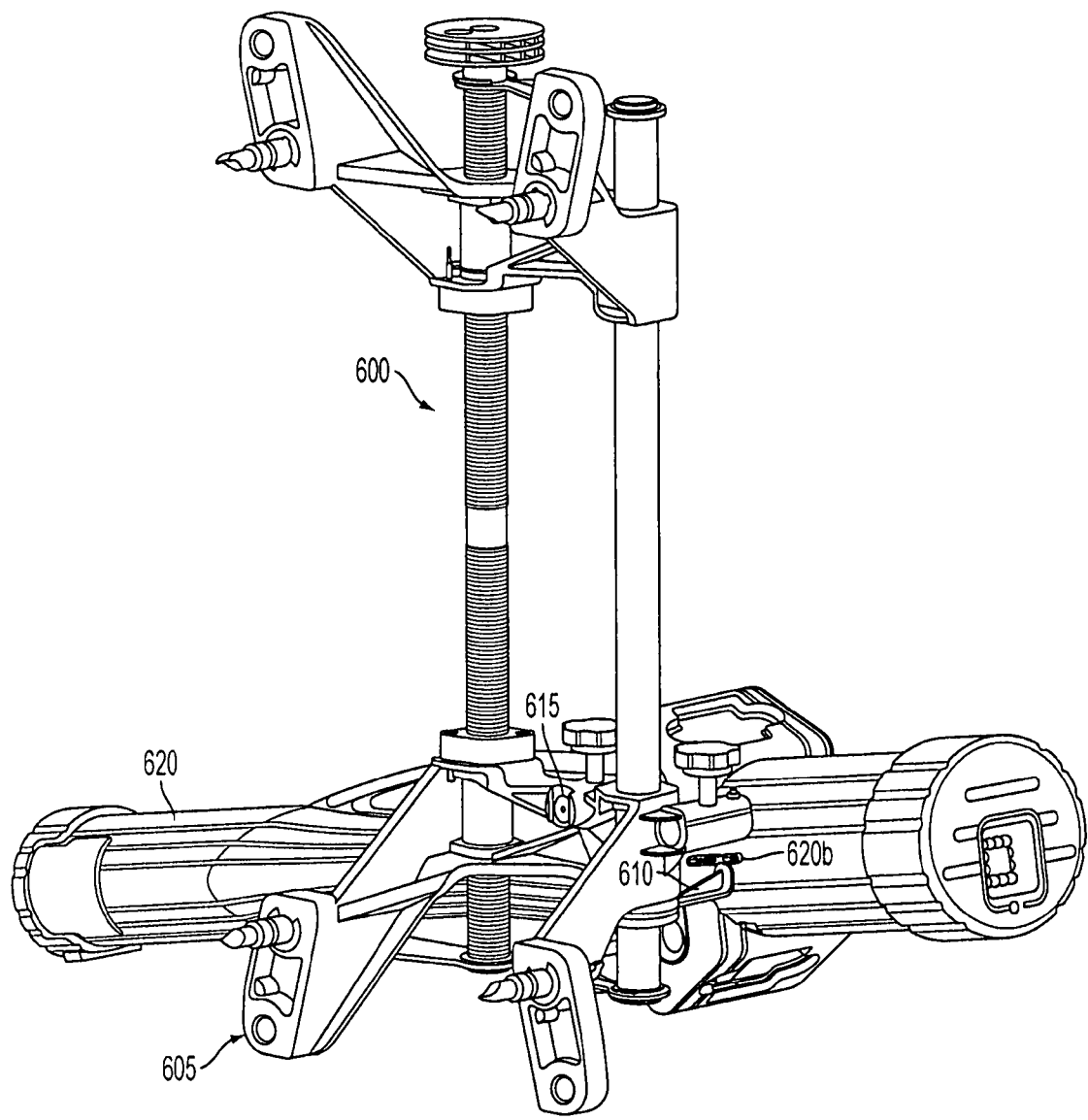
FIGS. 6c-6e illustrate the wheel clamp of FIGS. 6a and 6b with an alignment element attached, and are useful in explaining the operation of the tilting mechanism.
Figure 6D:
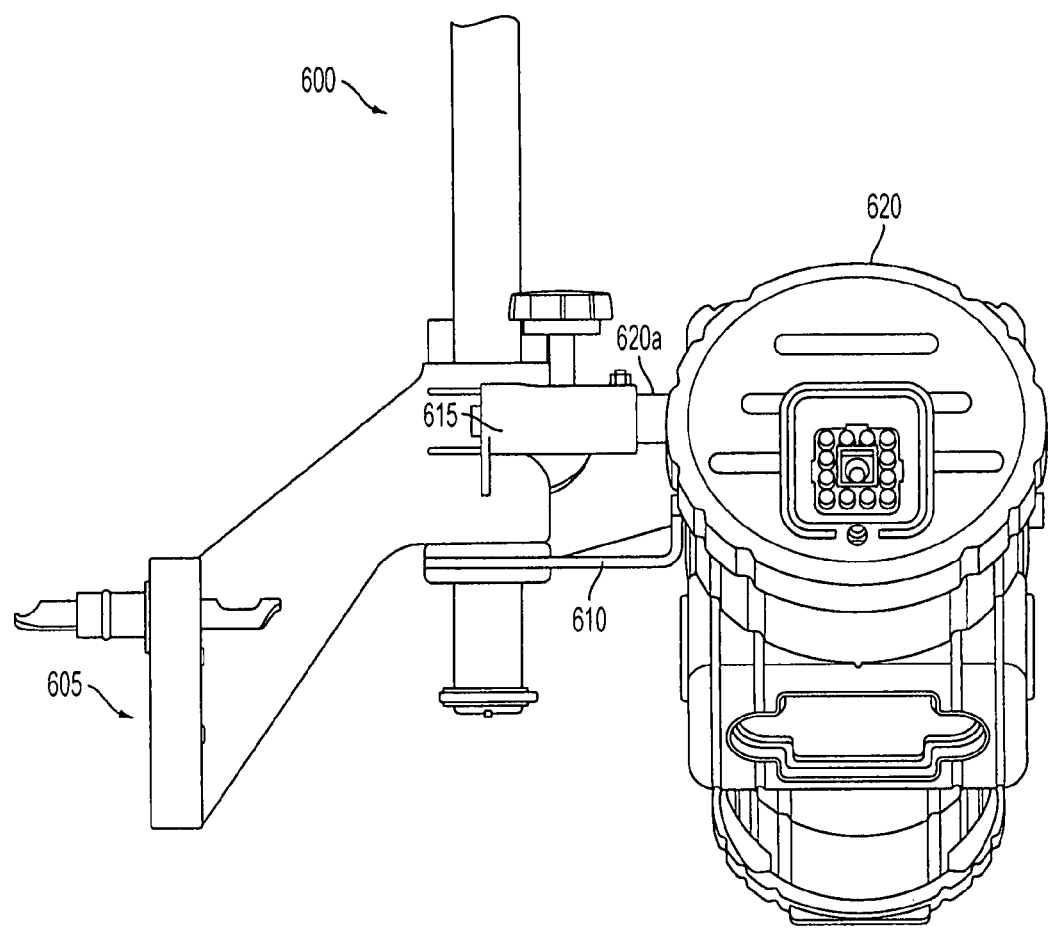
Figure 6E:
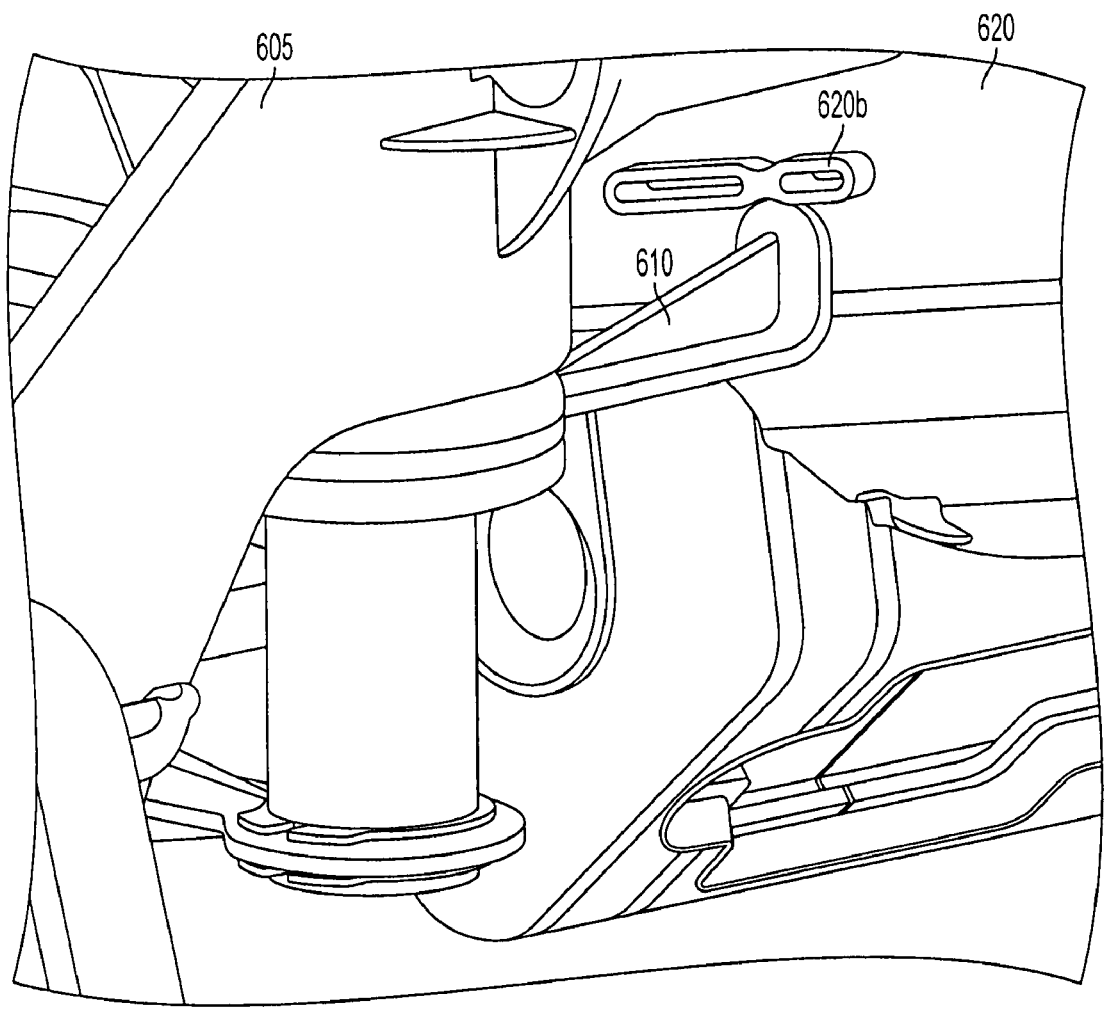

FIGS. 6c-6e show an alignment element 620 mounted to wheel clamp 600 at one of the mounting locations 615. Alignment element 620 has a horizontal mount 620a for rotatably mounting the alignment element 620 to the mounting location 615. Movable member 610 is shown in the second position where it engages a resting spot 620b of the alignment element 620 to hold the alignment element 620 in a predetermined tilted position relative to the lower bracket 605.

The disclosed sensor-tilting mechanisms have advantages over conventional solutions, in that they allow the cross toe sensor to be tilted lower than a conventional sliding bracket, and are easier to use than an add-on drop down adaptor. Moreover, they are lighter in weight and can be manufactured at a lower cost than the conventional brackets and adapters. Still further, disclosed tilting mechanisms are simpler than incorporating a manual brake in the measurement head to hold the head in the tilted position, and cost less to manufacture.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A wheel clamp assembly for attaching to a vehicle wheel for performing a wheel alignment on the vehicle, the wheel clamp assembly comprising:
    an upper sliding bracket for engaging the vehicle wheel;
    a lower sliding bracket for engaging the vehicle wheel;
    exactly one guide bar simultaneously slidably engagable with the upper and lower brackets when the upper and lower brackets are engaging the vehicle wheel; and
    a lead screw threadingly engagable with the upper and lower brackets when the guide bar is engaging the upper and lower brackets, for adjusting a distance between the upper and lower brackets to rigidly attach the wheel clamp assembly to the vehicle wheel;
    wherein the guide bar and the lead screw are substantially parallel to each other and spaced from each other when the guide bar and the lead screw are engaging the upper and lower brackets; and
    wherein the upper and lower brackets each has a first lateral end and a second lateral end, the guide bar engages proximal the first lateral end of each of the brackets, and the lead screw engages proximal the second lateral end of each of the brackets.

2. The assembly of claim 1, wherein the upper and lower brackets comprise cast magnesium.

3. The assembly of claim 1, wherein the lower bracket comprises a measuring device mounting location for adjustably mounting a wheel alignment element to the lower bracket.

4. The assembly of claim 3, wherein the measuring device mounting location comprises a hole for mounting the wheel alignment element.

5. The wheel clamp assembly of claim 3, wherein the wheel alignment element is rotatably mountable to the measuring device mounting location; and
    wherein the lower bracket comprises a movable member for engaging the wheel alignment element when it is mounted to the measuring device mounting location, for holding the wheel alignment element in a predetermined tilted position relative to the lower bracket.

6. The wheel clamp assembly of claim 5, wherein the movable member is pivotably mounted to the lower bracket to be movable from a first position where the movable member is not engaged with the alignment element, to a second position where the movable member engages a resting spot on the alignment element to hold the alignment element in the tilted position.

7. A wheel clamp assembly for attaching to a vehicle wheel for performing a wheel alignment on the vehicle, the wheel clamp assembly comprising:
    an upper sliding bracket for engaging the vehicle wheel;
    a lower sliding bracket for engaging the vehicle wheel;
    exactly one guide bar simultaneously slidably engagable with the upper and lower brackets when the upper and lower brackets are engaging the vehicle wheel; and
    a lead screw threadingly engagable with the upper and lower brackets when the guide bar is engaging the upper and lower brackets, for adjusting a distance between the upper and lower brackets to rigidly attach the wheel clamp assembly to the vehicle wheel;

wherein the lower bracket comprises a plurality of measuring device mounting locations for adjustably mounting a wheel alignment element to one of the mounting locations.

8. The assembly of claim 7, wherein the lower bracket has a first lateral end and a second lateral end, and the plurality of measuring device mounting locations includes a center mounting location between the first and second lateral ends, and a first offset mounting location proximal the first lateral end of the bracket.

9. The assembly of claim 8, wherein the lower bracket further comprises a second offset mounting location proximal the second lateral end of the bracket.

10. The assembly of claim 8, wherein the wheel alignment element is for sighting across a transverse axis of the vehicle to a second wheel alignment element on the other side of the vehicle when the wheel alignment element is mounted to the lower bracket; and wherein the center mounting location and the first offset mounting location of the lower bracket are disposed such that when the wheel alignment element is mounted to one of the center mounting location and the first offset mounting location, the wheel alignment element can sight to the second wheel alignment element.

11. A wheel clamp assembly for attaching to a vehicle wheel for performing a wheel alignment on the vehicle, the wheel clamp assembly comprising:

an upper sliding bracket for engaging the vehicle wheel;
a lower sliding bracket for engaging the vehicle wheel;
a guide bar simultaneously slidably engagable with the upper and lower brackets when the upper and lower brackets are engaging the vehicle wheel; and
a lead screw threadingly engagable with the upper and lower brackets when the guide bar is engaging the upper and lower brackets, for adjusting a distance between the upper and lower brackets to rigidly attach the wheel clamp assembly to the vehicle wheel;
wherein the lower bracket comprises a measuring device mounting location for adjustably mounting a wheel alignment element to the lower bracket;
wherein the lower bracket comprises a plurality of measuring device mounting locations for adjustably mounting a wheel alignment element to one of the mounting locations.

12. The assembly of claim 11, comprising a second guide bar simultaneously slidably engagable with the upper and lower brackets when the upper and lower brackets are engaging the vehicle wheel.

13. The assembly of claim 11, wherein the measuring device mounting location comprises a hole for mounting the wheel alignment element.

14. The assembly of claim 11, wherein the lower bracket has a first lateral end and a second lateral end, and the plurality of measuring device mounting locations includes a center mounting location between the first and second lateral ends, and a first offset mounting location proximal the first lateral end of the bracket.

15. The assembly of claim 14, wherein the lower bracket further comprises a second offset mounting location proximal the second lateral end of the bracket.

16. The assembly of claim 14, wherein the wheel alignment element is for sighting across a transverse axis of the vehicle to a second wheel alignment element on the other side of the vehicle when the wheel alignment element is mounted to the lower bracket; and wherein the center mounting location and the first offset mounting location of the lower bracket are disposed such that when the wheel alignment element is mounted to one of the center mounting location and the first offset mounting location, the wheel alignment element can sight to the second wheel alignment element.

17. The assembly of claim 11, wherein the upper and lower brackets comprise cast magnesium.

18. The wheel clamp assembly of claim 11, wherein the wheel alignment element is rotatably mountable to the measuring device mounting location; and wherein the lower bracket comprises a movable member for engaging the wheel alignment element when it is mounted to the measuring device mounting location, for holding the wheel alignment element in a predetermined tilted position relative to the lower bracket.

19. The wheel clamp assembly of claim 18, wherein the movable member is pivotably mounted to the lower bracket to be movable from a first position where the movable member is not engaged with the alignment element, to a second position where the movable member engages a resting spot on the alignment element to hold the alignment element in the tilted position.

20. A wheel clamp assembly for attaching to a vehicle wheel for performing a wheel alignment on the vehicle, the wheel clamp assembly comprising:

an upper sliding bracket for engaging the vehicle wheel;
a lower sliding bracket for engaging the vehicle wheel;
a center sliding bracket for adjustably mounting a wheel alignment element;
exactly one guide bar simultaneously slidably engagable with the upper, center and lower brackets when the upper and lower brackets are engaging the vehicle wheel; and
a lead screw threadingly engagable with the upper and lower brackets when the guide bar is engaging the upper, center and lower brackets, for adjusting a distance between the upper and lower brackets to rigidly attach the wheel clamp assembly to the vehicle wheel;
wherein the lead screw is rotatably mountable to the center bracket at a predetermined position along a longitudinal axis of the lead screw when the guide bar is engaging the upper, center and lower brackets, such that the center bracket remains at the predetermined position when the distance between the upper and lower brackets is adjusted;
wherein the guide bar and the lead screw are substantially parallel to each other and spaced from each other when the guide bar and the lead screw are engaging the upper, center and lower brackets; and
wherein the upper, center and lower brackets each has a first lateral end and a second lateral end, the guide bar engages proximal the first lateral end of each of the brackets, and the lead screw engages proximal the second lateral end of each of the brackets.

21. The assembly of claim 20, wherein the upper, center and lower brackets comprise cast magnesium.

22. A wheel alignment element for mounting to a wheel clamp assembly attached to a wheel of a vehicle, the wheel alignment element comprising:

a body having a longitudinal axis;
a horizontal mount attached to the body along the longitudinal axis and perpendicular to the longitudinal axis for rotatably mounting the body to the wheel clamp; and
a weight movably mounted to the body along the longitudinal axis for tilting the body to a predetermined position relative to the wheel clamp.

23. The wheel alignment element of claim 22, wherein the weight is slidably mounted to the body along the longitudinal axis.

24. The wheel alignment element of claim 23, wherein the weight is slidably mounted to a handle.

25. The wheel alignment element of claim 22, wherein the weight is removable and replaceable in a plurality of locations along the longitudinal axis.

26. The wheel alignment element of claim 22, wherein the body is elongated, and the wheel alignment element comprises a wheel alignment sensor mounted proximal an end of the body.

* * * * *